United States Patent
Hartupee, Jr. et al.

(10) Patent No.: US 8,896,880 B2
(45) Date of Patent: *Nov. 25, 2014

(54) IMAGING DATA STREAM METHOD AND APPARATUS FOR FULL-COLOR SUPPORT

(75) Inventors: George Kenneth Hartupee, Jr., Rancho Cucamonga, CA (US); Hayley H. Yau, Los Angels, CA (US)

(73) Assignee: Xerox Corporation, Norwalk, CT (US)

( * ) Notice: Subject to any disclaimer, the term of this patent is extended or adjusted under 35 U.S.C. 154(b) by 1870 days.

This patent is subject to a terminal disclaimer.

(21) Appl. No.: 11/598,971

(22) Filed: Nov. 14, 2006

(65) Prior Publication Data

US 2008/0111999 A1    May 15, 2008

(51) Int. Cl.
*G06F 15/00* (2006.01)
*H04N 1/60* (2006.01)
*G06F 17/00* (2006.01)
*G03G 15/01* (2006.01)

(52) U.S. Cl.
CPC .................................... *H04N 1/603* (2013.01)
USPC ........... 358/1.9; 358/1.1; 358/1.13; 358/1.15; 715/225; 399/178

(58) Field of Classification Search
USPC .......... 358/1.1, 1.4, 1.6, 1.9, 1.11, 1.13, 1.14, 358/1.15, 1.16, 1.18, 2.1, 518, 523, 524; 710/8, 10, 14, 15, 16, 19; 715/200, 715/229, 321, 323, 327; 382/162, 167
See application file for complete search history.

(56) References Cited

U.S. PATENT DOCUMENTS

| | | | | |
|---|---|---|---|---|
| 5,134,493 A | * | 7/1992 | Laman et al. | 358/296 |
| 5,153,739 A | * | 10/1992 | Laman et al. | 358/300 |
| 5,237,425 A | * | 8/1993 | Tagami et al. | 358/300 |
| 6,894,797 B1 | * | 5/2005 | Hayes et al. | 358/1.15 |
| 2005/0050465 A1 | * | 3/2005 | Horton et al. | 715/526 |
| 2005/0225782 A1 | * | 10/2005 | Livengood et al. | 358/1.9 |
| 2006/0119869 A1 | | 6/2006 | Laman et al. | 358/1.9 |

OTHER PUBLICATIONS

Xerox Special Information Systems, LCDS-Spectrum Implementation Guide, Mar. 2006, entire document.*
Lytrod Software, Proform97(tm) description, 1 page.*
Lytrod Software, Proform97(tm) sales brochure, Jun. 28, 2004, 2 pages.*
Xerox eStore, Lytrod Software Proform97(tm) overview, 2 pages.*

(Continued)

*Primary Examiner* — Steven Kau
(74) *Attorney, Agent, or Firm* — Kermit D. Lopez; Luis M. Ortiz; Ortiz & Lopez, PLLC

(57) ABSTRACT

A method and apparatus for providing extensions to an LCDS imaging data stream. An LCDS imaging data stream is modified utilizing existing constructs of the imaging data stream in order to provide extensions to the imaging data stream for full-color rendering capabilities without re-writing or converting the imaging data stream into another format. Modifying an LCDS imaging data stream generally includes modifying one or more palettes associated with the imaging data stream to include a full color standardized approach to specifying colors, configuring one or more ink values associated with the imaging data stream with a full color palette, configuring a convenience specification associated with the imaging data stream to include at least one full-color space, and providing a variable color form capability for the imaging data stream in place of a palette syntax associated with the imaging data stream in order to provide a convenience feature for a user of the imaging data stream.

15 Claims, 3 Drawing Sheets

(56) References Cited

OTHER PUBLICATIONS

XPLOR, Chapter Meeting Summary, Jan. 19, 2006, 5 pages.*
Elixir Technologies, DesignPro Tools(tm) Xerox product description, 3 pages.*
xerox.com, TXC Pricing for NY State and local Government, Sep. 23, 2004, 4 pages.*
Lytrod Software, Proform97(tm) advertisement / specifications sheet, Jun. 28, 2004, 2 pages.*
Lytrod Software, Proform97(tm) advertisement / specifications sheet, obtained from: http://web.archive.org/web/20040628131330/lytrod.com/products/Product_PDFs/Proform97_Flyer_Color.pdf, available date Jun. 28, 2004, 2 pages.*
Xerox Corporation, Xerox 4890 Highlight Color Laser Printing System Product Reference, version 5.0, Nov. 1994, all pages.*
Xerox Corporation, Xerox 4850/4890 Highlight Color Laser Printing Systems Print Description Language Reference, version 5.0, Nov. 1994, all pages.*
Xerox Corporation, Xerox 4850/4890 Highlight Color Laser Printing System Forms Creation Reference, version 5.0, Nov. 1994, all pages.*
Xerox Corporation, Xerox DocuPrint EPS—Using LCDS Print Description Language, version 3.7, May 2003, all pages.*
Lytrod Software, Proform97 (TM) product order form, Aug. 23, 2004, p. 1.*
Lytrod Software, Proform97 (TM) product description web page, Oct. 13, 2004, p. 1.*
GrammarBook, Parentheses Punctuation Rules from http://www.grammarbook.com/punctuation/parens.asp, all pages.*
Lytrod Software, Proform97(tm) description, 1 page, obtained from http://www.lytrod.com/products/proform97.php.*
*Xerox DocuSP Color Controller*, Xerox Corporation.
*Xerox DocuSP*, Xerox Corporation.
*Highlight Color's Communications Effectiveness, Production Efficiency Arrives for New Class of More Graphically Oriented Documents*, Production Systems Group, Public Relations Offices, Xerox Corporation.
*LCDS-Spectrum Implementation Guide*, Mar. 2006, Xerox Corporation.
*Xerox DocuTech 128/155/180 Highlight Color Systems*, Xerox Corporation.

* cited by examiner

IMAGING DATA STREAM METHOD AND APPARATUS FOR FULL-COLOR SUPPORT

TECHNICAL FIELD

Embodiments are generally related to data-processing methods and systems. Embodiments are also related to the field of printing methods and systems. Embodiments are additionally related to imaging data streams and color imaging models thereof. Embodiments are also related to data streams for imaging via document rendering systems.

BACKGROUND

Digital printing systems can be constructed from two essential components. The first component is a print engine and the second component is a print controller. The print engine and controller units can be developed and implemented independently of one another, or integrated into the product that is ultimately manufactured. In general, the print controller handles communications and interfaces with a host system.

A print controller can also interpret print commands transmitted from the host and translate them into signals required to drive the print engine. Printing functions ranging from color management to duplexing generally depend on the interaction of the print engine and the controller. Digital print systems include, for example, desktop units, copy machines, printers, print-on-demand systems, and so forth.

One of the functions of a print controller is the ability to effectively enable a print stream format. A number of different print stream formats are utilized in the printing arts. A commonly utilized print stream format (also referred to herein as an "imaging data stream") is the Line Conditioned Data Stream (LCDS), developed by Xerox Corporation of Stamford, Conn. LCDS is one type of an imaging data stream that can be utilized to drive, for example production printers. Unlike page description languages, which create pages from high-level graphical constructs, print command languages such as LCDS contain printer commands interspersed with data and are processed and executed sequentially.

One particular type of LCDS format is known as "Highlight Color LCDS". The concept of "Highlight Color" has been implemented in the context of so-called "Highlight" printers. Anyone who has watched U.S. television in recent years has probably seen one of the recent commercials that begin in black-and-white, then introduces a single color to spotlight the sponsor's product or logo. The effect is dramatic, immediately focusing the viewer's attention right where the advertiser wants it.

In full-color commercials, colors are selected and coordinated to establish the spot's mood, its "look and feel." But when black-and-white images are used to establish the atmosphere, color plays a much different role. While the color selected usually ties to the sponsor's brand identity, the color choice almost doesn't matter. Whatever the color, it will contrast dramatically with the black-and-white background and have the desired effect of getting the viewer's attention.

This distinction between the functions of highlight and full color has long been recognized in document production, and actually demonstrates a fundamental difference between transactional and publishing print applications. In transactional printing of invoices, statements and other documents that often are jammed with data, highlight color can help the reader make sense of the document by directing attention to the most critical information—the amount and date due, for example. In publishing, color more often is deployed artistically, to establish the look and feel of a brochure or advertisement.

Today, however, transactional and publishing applications increasingly borrow from one another, blurring distinctions between them. More publishing documents use variable data and images to personalize individual pieces in long print runs, which is a capability that had long been the sole realm of transactional printing. Similarly, transactional applications have grown more graphically sophisticated, moving from graphically limited line printers to laser models offering increasingly finer print resolutions and imaging capabilities.

Further, as corporate reprographics centers merge with data center printing operations, and as centralized applications move to distributed locations, printing equipment often is expected to serve a wider range of applications. Xerox Corporation of Stamford, Conn. has developed a line of highlight color production printers that can print at, for example, resolutions of 600 dots per inch (dpi) responds to these trends. With such newly developed highlight color production rendering devices, two-color digital printing can now support the increasing requirement for sophisticated graphical capabilities and data stream flexibility in transactional printers.

Currently, users who desire to print Highlight Color LCDS jobs with a variety of base toners must either maintain multiple highlight printers with different loaded toner or stop the production between runs to change the base Highlight toner. There presently does not exist a technique or device for readily and efficiently adding full color elements to existing or new jobs. This ability is increasingly important as full-color rendering devices such as printers are achieving greater production speeds. It is believed that a need exists for a method and system that would permit LCDS users to explore full color rendering capabilities without expensive data and resource translations. The alternative is for users to convert perhaps millions of records of LCDS data to another format, which is often problematic and expensive.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for an improved rendering method and apparatus.

It is another aspect of the present invention to provide for a method and apparatus for providing extensions to an imaging data stream.

It is a further aspect of the present invention to provide language extensions in support of multiple full-color callouts in individual elements of an imaging data stream form or variable data.

The aforementioned aspects and other objectives and advantages can now be achieved as described herein. A method and apparatus are disclosed for providing extensions to an LCDS imaging data stream. An LCDS imaging data stream is modified utilizing existing constructs of the LCDS imaging data stream in order to provide extensions to the imaging data stream for multiple full-color rendering capabilities without re-writing or converting the imaging data stream into another format. Modifying such an LCDS imaging data stream generally includes modifying one or more palettes associated with the imaging data stream to include a full color standardized approach to specifying colors, configuring one or more ink values associated with the LCDS imaging data stream with a full color palette, configuring the current convenience specification associated with the LCDS imaging data stream to include at least one full-color space, and providing a variable color form capability for the imaging data stream in place of the current palette syntax associated with the LCDS imaging data stream in order to provide a new user convenience feature.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

The embodiments discussed herein can be implemented in the context of imaging data streams. An example of an imaging data stream is the Line Conditioned Data Stream (LCDS), which is a line data stream utilized to drive Xerox Corporation's production printers from host systems. Unlike page description languages, which create pages from high-level graphical constructs, print command languages such as LCDS contain printer commands interspersed with data and are processed and executed sequentially.

Figure 1:
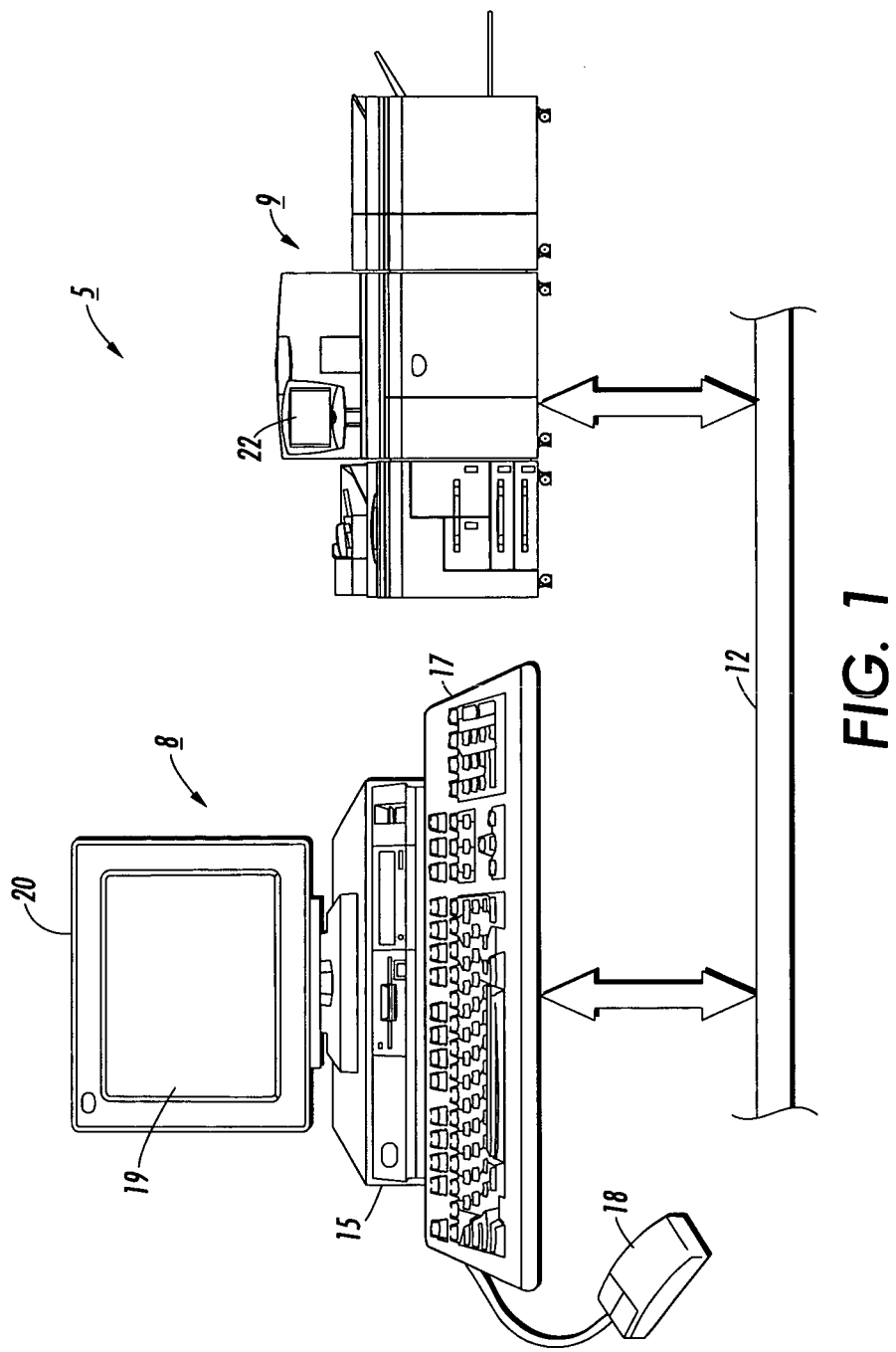
FIG. 1 illustrates a diagram of a data-processing system including a rendering device adapted to render electronically encoded documents transmitted from a data-processing apparatus, in accordance with a preferred embodiment.

With reference now to the drawings where the showings are for the purpose of illustrating a preferred embodiment of the invention and not for limiting the same, FIG. 1 illustrates an electronic document processing or rendering system 5 that can be implemented in accordance with one embodiment. Alternative or preferred embodiments disclosed herein can therefore be implemented in the context of the rendering system 5 depicted in FIG. 1. In general, the electronic document processing (rendering) system 5 includes a data-processing apparatus 8 and a rendering device 9 that are connected with a suitable communication channel such as, for example an Ethernet connection 12. The connection 12 enables image data from one or more remote sources such as data-processing apparatus 8, to be input to the rendering device 9 for hardcopy rendering. The data-processing apparatus 8 can generally be provided in the form of one or more processor readable storage devices having a processor readable code embodied on the processor readable storage devices, the processor readable code for programming one or more processors to perform one or more different methods.

The data-processing apparatus 8 includes a processing unit 15 for processing user inputs received from keyboard 17 and pointing device or mouse 18, through user interface 19 displayed on monitor 20. The user interface 19 collectively represents user inputs through which control instructions are used to develop electronic images. The rendering device 9, which can be configured to include its own user interface 22 for monitoring print job requests, can be adapted to print hardcopy color and/or black and white image renderings of selected electronic images developed via data-processing apparatus 8.

Figure 2:
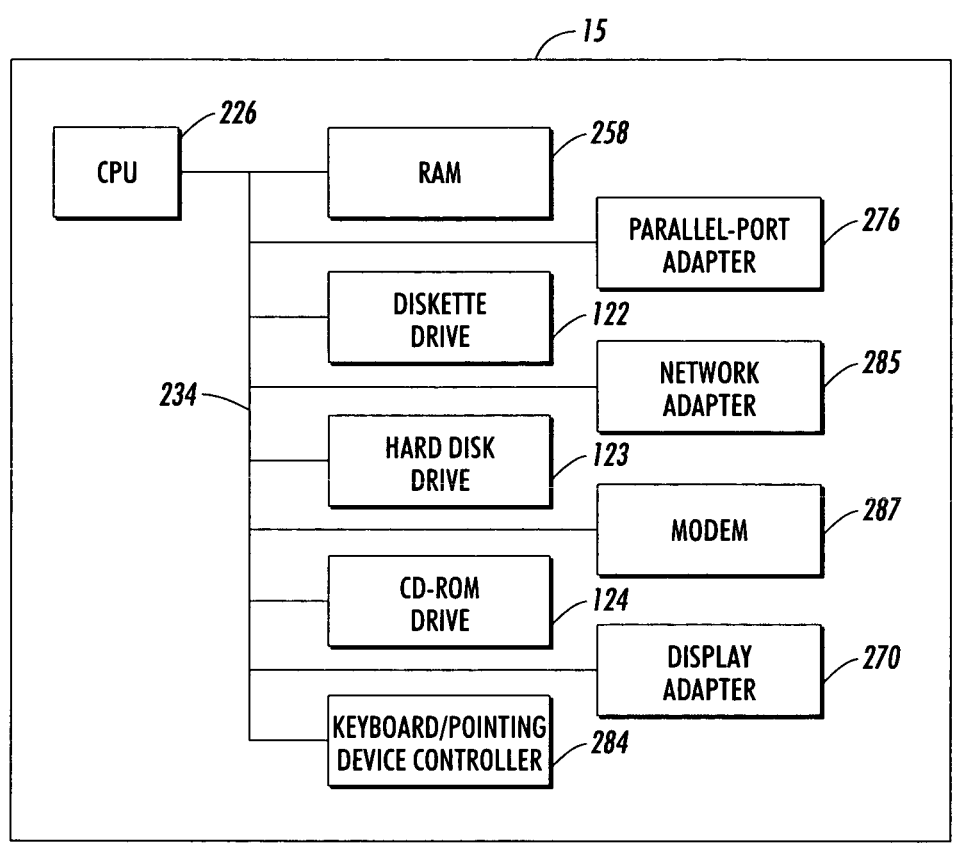
FIG. 2 illustrates a block diagram of the principal components of the data-processing apparatus and processing unit depicted in FIG. 1 in accordance with a preferred embodiment.

Referring to FIG. 2, there is depicted a block diagram of the principal components of data-processing apparatus 8 and in particular the processing unit 15. In general, a CPU (Central Processing Unit) 226 is connected via a system bus 234 to RAM (Random Access Memory) 258, diskette drive 122, hard-disk drive 123, CD-ROM drive 124, keyboard/pointing-device controller 284, parallel-port adapter 276, network adapter 285, display adapter 270, and modem 287. Although the various components of FIG. 2 are drawn as single entities, each may consist of a plurality of entities and may exist at multiple levels.

Processing unit 15 includes the CPU 226, which executes instructions. CPU 226 includes the portion of data-processing apparatus 8 that controls the operation of the entire data-processing 8, including executing the arithmetical and logical functions contained in a particular computer program. Although not depicted in FIG. 2, CPU 226 typically includes a control unit that organizes data and program storage in a computer memory and transfers the data and other information between the various parts of the computer system. CPU 226 generally includes an arithmetic unit that executes the arithmetical and logical operations, such as addition, comparison, and multiplication. CPU 226 accesses data and instructions from and stores data to volatile RAM 258.

CPU 226 can be implemented, for example, as any one of a number of processor chips, or any other type of processor, which are available from a variety of vendors. Although data-processing system 8 is shown to contain only a single CPU and a single system bus, the present invention applies equally to computer systems that have multiple CPUs and to computer systems that have multiple buses that each performs different functions in different ways.

RAM 258 comprises a number of individual, volatile-memory modules that store segments of operating system and application software while power is supplied to data-processing apparatus 8. The software segments can be partitioned into one or more virtual-memory pages that each contains a uniform number of virtual-memory addresses. When the execution of software requires more pages of virtual memory than can be stored within RAM 258, pages that are not currently needed are swapped with the required pages, which are stored within non-volatile storage devices 122 or 123. RAM 258 is a type of memory designed such that the location of data stored in it is independent of the content. Also, any location in RAM 258 can be accessed directly without needing to start from the beginning.

Hard-disk drive 123 and diskette drive 122 are electromechanical devices that read from and write to disks. The main components of a disk drive are a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from data-processing apparatus 8.

Keyboard/pointing-device controller 284 interfaces processing unit 15 with keyboard 17 and graphical-pointing device 18. In an alternative embodiment, keyboard 17 and graphical-pointing device 18 may possess separate controllers. Display adapter 270 can translate graphics data from CPU 226 into video signals utilized to drive the display device 20.

Finally, processing unit 15 can include a network adapter 285, a modem 287, and a parallel-port adapter 276, which facilitate communication between data-processing system 8 and peripheral devices or other computer systems, such as, for example, the rendering device 9. Parallel-port adapter 276 can transmit printer-control signals to rendering device 9 through a parallel port. Network adapter 285 can connect data-processing apparatus 8 to an un-illustrated local area network (LAN). A LAN provides a user of data-processing system 5 with a means of electronically communicating information, including software, with a remote computer or a network logical-storage device. In addition, a LAN supports distributed processing, which enables data-processing apparatus 8 to share a task with other computer systems linked to the LAN, which can also be implemented in the context of a wireless local area network (WLAN).

Modem 287 supports communication between data-processing system 8 and/or system 5 over a standard telephone line. Furthermore, through modem 287, data-processing apparatus 8 can access other sources such as a server, an electronic bulletin board, and the Internet or the well-known World Wide Web.

The configuration depicted in FIG. 1 is but one possible implementation of the components depicted in FIG. 2. Portable computers, laptop computers, and network computers or Internet appliances are other possible configurations. The hardware depicted in FIGS. 1-2 may vary for specific applications. For example, other peripheral devices such as optical-disk media, audio adapters, or chip-programming devices, such as PAL or EPROM programming devices well-known in the art of computer hardware, may be utilized in addition to or in place of the hardware already depicted.

As will be described in detail below, aspects of the preferred embodiment pertain to specific method steps implementable on computer systems. In an alternative embodiment, the invention may be implemented as a computer program-product for use with a computer system, which can be implemented as devices such as networked computer workstations, computer desktop and peripheral devices, servers and the like. The programs defining the functions of the preferred embodiment can be delivered to a computer via a variety of signal-bearing media, which include, but are not limited to: (a) information permanently stored on non-writable storage media (e.g., read-only memory devices within a computer such as CD-ROM disks readable by CD-ROM drive 124); (b) alterable information stored on writable storage media (e.g., floppy disks within diskette drive 122 or hard-disk drive 123); or (c) information conveyed to a computer by a communications media, such as through a computer or telephone network, including wireless communications. Such signal-bearing media, when carrying computer-readable instructions that direct the functions of one or more embodiments of the present invention, and/or represent alternative embodiments of the present invention.

Note that in order to appreciate the context in which the embodiments can be implemented, it is helpful to review a highlight-color ink naming technique. In some highlight-color printers, for example, highlight color toners include standard Red, Blue and Green. There are also a number of other special colors such as Ruby, Royal and Brown. It is a straightforward process for specifying a particular tint and shade of color in highlight-color rendering devices, such as a highlight-color LCDS printer. For example, to color a filled box, users simply identify how much black toner to mix in via a command that they embed in a document in the imaging data stream directed to a highlight color printer. For example, a highlight color such as 'R30K10' can indicate to print a patch of color that is 30% Red toner and 10% black (K) ["K" is used for "black to avoid mixing up Blue ("B") and Black ("K")].

Whatever percentage is left over by default is the amount of white paper that shows through. Assume, for example, that 60% of the color is white, meaning that it is a light color. A color such as 'B100' (100% Blue toner) has no black mixed in and no white paper showing through. One can also utilize "H" to mean "generic Highlight toner" as in 'H50K10' (50% Highlight toner mixed with 10% black). When a document is ready to print, the specific Highlight toner to be utilized can be identified by naming a "Palette"—again via a command embedded in a document. In such a generic system, a full ink name can be composed of two parts: the "Palette" (like 'RED'), and the HK values (e.g., 'H50K10'). The "RED" palette informs the rendering device or printer to interpret the "H" as RED.

Later, if the toner physically loaded on the printer is changed to Green and the document is expected to be printed in shades and tints of Green, the Palette specification in the document can be changed to GREEN and all the colors such as 'H50K10' will print in the same tints and shades of green instead of red.

In a full-color LCDS configuration, for example, a number of legacy highlight color palettes (e.g., highlight toners) can be pre-defined, with more added to fill out the rainbow. The supplied LCDS pre-defined highlight color Palettes can be, for example, RED, BROWN, ORANGE, YELLOW, LIME, GREEN, TEAL, CYAN, BLUE, ROYAL, VIOLET, PURPLE, MAGENTA, RUBY and CARDINAL. For legacy highlight-color jobs, such pre-defined palettes can ensure that legacy jobs will print similarly on a full-color printer. In addition, for legacy Highlight-Color Forms or jobs that used "HK" color definitions, it is relatively easy to simply change the PALETTE to be any of the above pre-defined highlight color Palettes. New full-color Palettes can be defined, however, at will. If the supplied predefined Palettes are insufficient, any Named Color in the DOCUSP Color Manager (a color management tool) can be used as a "Palette"

Figure 3:
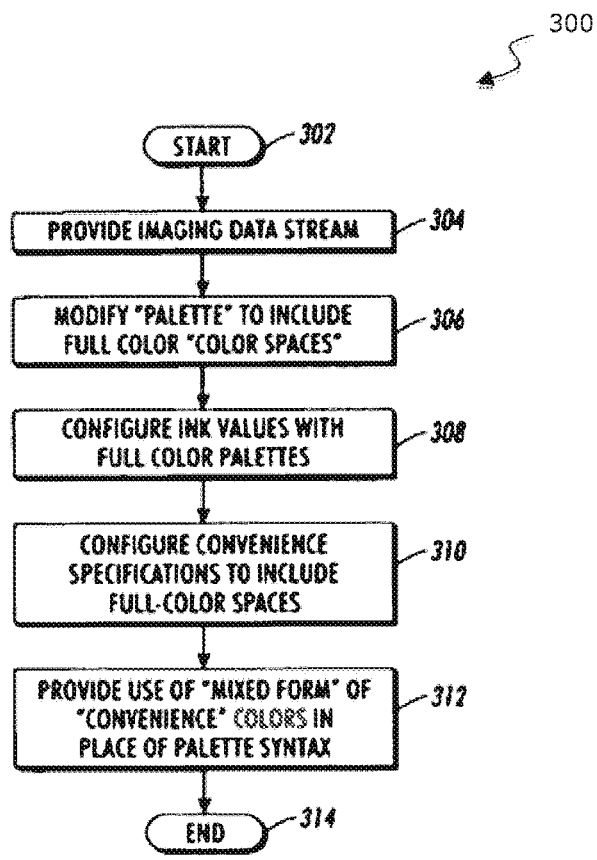
FIG. 3 illustrates a high-level flow chart of operations illustrating logical operational steps of a method, which may be implemented in accordance with a preferred embodiment.

FIG. 3 illustrates a high-level flow chart of operations illustrating logical operational steps of a method 300, which may be implemented in accordance with a preferred embodiment. The method 300 depicted in FIG. 3 generally provides a technique for providing extensions to an imaging data stream language such as, for example, LCDS, that are compatible with existing imaging data stream syntax, while allowing users to specify full-color objects in an imaging data stream resource or variable data job.

As indicated at block 302, the process begins. Next, as illustrated at block 304, an imaging data stream, such as LCDS, can be provided in order for such an imaging data stream to be modified for new extensions and capabilities. Thereafter, as illustrated at block 306, an operation can provided in which "palettes" associated with the imaging data stream are modified to include full color "color spaces". The operation depicted at block 306 can be explained by reference to an example involving the highlight LCDS language, which possesses the concept of a "PALETTE" as discussed earlier, which is a grouping of colors having a similar base toner. By extending the concept of a PALETTE, as indicated at block 306, to include full color "color spaces" or well-defined standardized systems of specifying colors, the imaging data stream or highlight LCDS language becomes much richer. New syntax or language constructs are thus not required.

Thus, for example, in addition to the highlight color Palettes such as "RED," "BLUE," "MONO," and so forth, the extended full-color LCDS language now recognizes "Palettes" such as the standard color spaces "RGB," "CMYK," and even named color spaces such as "Pantone". When a Palette is specified as "RGB", for example, the specific meaning is that the three numbers that follow will be taken to indicate particular values of Red, Green, and Blue to print. This is a direct analog to the current Highlight color meaning, in which the two numbers that follow are taken to indicate how much of the base toner (e.g., "RUBY") to print, and how much black toner to print in addition.

Thereafter, as indicated at block 308, an operation is performed in which INK values are configured with "full color" spaces. As indicated earlier, the highlight LCDS language, for example, follows a PALETTE specification with an INK specification that includes numbers or a name that maps to a particular set of INKs to print. The INK numbers in the highlight LCDS language, for example, specify a particular amount of base toner and black toner mixed on the page. Thus, the operation depicted at block 308, permits the INK values to be similarly configured with standard full-color "Palettes" such as, for example, "CMYK," which specify particular amounts of C (Cyan), M (Magenta), Y (Yellow) and K (Black) to be printed on the page. By processing the operation described at block 308, the use of either numeric formulas (such as CMYK.24,17,69,14) or Named Color keywords (such as "FIREENGINERED") can be used to extend the Highlight LCDS INK syntax, thereby permitting users an unlimited set of colors to use within a page.

Next, as indicated at block 310, an operation is performed in which convenience specifications associated with the imaging data stream are configured to include full-color spaces. Again, with reference to the example imaging data stream of highlight color LCDS, such an imaging data stream can allow for "convenience" specifications of highlight inks. For example, the construct "G17K5" can be a shorthand representation for the PALETTE.INK specification, "GREEN.H17K5". The implied Palette is "GREEN", implied by the use of the "G" in the short hand form, and the ink values are 17 for Green and 5 for Black ("K"). The operation depicted at block 310 thus permits the extension of the concept of convenience specifications to full-color spaces. Thus, in the example provided above, the color "C24M17Y69K14" is a short hand form in Full-Color LCDS for the PALETTE.INK specification "CMYK.24,17,69,14".

Thereafter, as illustrated at block 312, an operation can be processed in which the imaging data stream is modified to permit the use of "mixed form" or "convenience" colors in the place of the PALETTE syntax for infinitely extensible, defined "on-the-fly" Palettes. For example, instead of the use of pre-defined Palette names such as "BLUE", a Palette name can be used such as, for example, "R0G0B234", which is a particularly defined Blue color. This extends the LCDS language to provide for a convenience to the user. The process then terminates as indicated at block 314.

The advantage of this methodology is that it can be used to support the migration of user's LCDS imaging data stream jobs from monochrome or Highlight color to full-color. Another advantage of this approach is that users can introduce modern color elements into their current LCDS documents without re-writing or converting the imaging data stream into another format. An additional advantage of such an approach is that it can be used to extend an existing LCDS language using existing constructs already present in the language, so that implementation is made much easier.

Figure 4:
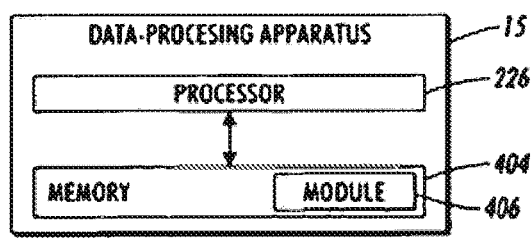
FIG. 4 illustrates a high-level block diagram of the data-processing apparatus in accordance with an alternative embodiment.

FIG. 4 illustrates a high-level block diagram of the data-processing apparatus 15 in accordance with an alternative embodiment. Note that the data-processing apparatus 15 can be associated and/or integrated with a rendering device such as rendering device 9 described earlier. Thus, in FIGS. 1-4, identical or similar parts or elements are generally indicated by identical reference numerals. Data-processing apparatus 15 (and hence rendering device 9) can be provided in the context of a software module 406 that is stored in a memory 404 and which can be retrieved and processed by a processor 226. Note that an example of memory 404 includes components such as, but not limited to the RAM 258 depicted in FIG. 2. Other examples of "memory" 404 include ROM (Read Only Memory), CD-ROM disks, flash memory, and so forth. In general, data-processing apparatus 15 can be composed of one or more processor readable storage devices (e.g., memory 404) having a processor readable code (e.g., software module 406) embodied on one or more of the processor readable storage devices, the processor readable code for programming one or more processors (e.g., CPU 226) to perform a particular activity.

Note that the embodiments disclosed herein can be implemented in the context of a host operating system and one or more module(s) such as module 406. Module 406 can thus be used to implement the operational steps of blocks 302-314 depicted in FIG. 3 herein. In the computer programming arts, a software module can be typically implemented as a collection of routines and/or data structures that perform particular tasks or implement a particular abstract data type. Software modules generally comprise instruction media storable within a memory location of a data-processing apparatus and are typically composed of two parts. First, a software module may list the constants, data types, variables, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method comprising:
   providing a highlight Line Conditioned Data Stream, LCDS imaging data stream embodied as non-transitory instruction media residing in a computer; and
   modifying said Line Conditioned Data Stream, LCDS imaging data stream embodied as non-transitory instruction media residing in a computer for utilizing existing constructs of said highlight Line Conditioned Data Stream, LCDS imaging data stream in order to provide extensions to said highlight Line Conditioned Data Stream, LCDS imaging data stream by adding extensions to said highlight Line Conditioned Data Stream, (LCDS imaging data stream) for multiple full-color rendering capabilities without re-writing or converting said highlight Line Conditioned Data Stream, LCDS imaging data stream into another format.

2. The method of claim 1 wherein said modifying of said highlight Line Conditioned Data Stream, LCDS imaging data stream embodied as non-transitory instruction media residing in a computer further comprises:

modifying at least one predefined highlight palette associated with said highlight Line Conditioned Data Stream, LCDS imaging data stream to include a full color standardized approach to specifying colors.

3. The method of claim 1 wherein said modifying of said highlight Line Conditioned Data Stream, LCDS imaging data stream embodied as non-transitory instruction media residing in a computer further comprises:

configuring at least one ink value associated with said highlight Line Conditioned Data Stream, LCDS imaging data stream with at least one full color palette.

4. The method of claim 1 wherein said modifying of said highlight Line Conditioned Data Stream, LCDS imaging data stream embodied as non-transitory instruction media residing in a computer further comprises:

configuring a convenience specification associated with said highlight Line Conditioned Data Stream LCDS imaging data stream to include at least one full-color space wherein said convenience specification maps a shorthand inkname associated with a specific color to a particular set of inks to print.

5. The method of claim 1 wherein said modifying of said highlight Line Conditioned Data Stream, LCDS imaging data stream embodied as non-transitory instruction media residing in a computer further comprises:

providing a variable color form capability comprising mixed form colors for said highlight Line Conditioned Data Stream, LCDS imaging data stream in place of a palette syntax associated with said highlight Line Conditioned Data Stream, LCDS imaging data stream in order to provide a convenience feature for a user of said highlight Line Conditioned Data Stream, LCDS imaging data stream to define a user selected palette.

6. The method of claim 1 wherein said modifying of said highlight Line Conditioned Data Stream, LCDS imaging data stream embodied as non-transitory instruction media residing in a computer comprises:

modifying at least one palette associated with said highlight Line Conditioned Data Stream, LCDS imaging data stream to include a full color standardized approach to specifying colors; said modifying at least one palette comprises:

configuring at least one ink value associated with said highlight Line Conditioned Data Stream, LCDS imaging data stream with at least one full color palette;

configuring a convenience specification associated with said highlight Line Conditioned Data Stream, LCDS imaging data stream to include at least one full-color space; and providing a variable color form capability for said highlight Line Conditioned Data Stream, LCDS imaging data stream in place of palette syntax associated with said highlight Line Conditioned Data Stream, LCDS imaging data stream in order to provide a convenience feature for a user of said highlight Line Conditioned Data Stream, LCDS imaging data stream.

7. An apparatus comprising one or more processor-readable storage devices having a processor-readable code embodied on said one or more processor-readable storage devices, said processor-readable code programs one or more processors to perform the method, comprising:

providing a highlight Line Conditioned Data Stream, LCDS imaging data stream; and modifying said highlight Line Conditioned Data Stream, LCDS imaging data stream utilizing existing constructs of said highlight Line Conditioned Data Stream, LCDS imaging data stream in order to provide extensions to said highlight Line Conditioned Data Stream, LCDS imaging data stream by adding extensions to said highlight Line Conditioned Data Stream, (LCDS imaging data stream) for multiple full-color rendering capabilities without re-writing or converting said highlight Line Conditioned Data Stream, LCDS imaging data stream into another format.

8. The apparatus of claim 7 wherein said modifying of said highlight Line Conditioned Data Stream, LCDS imaging data stream further comprises:

modifying at least one predefined highlight palette associated with said highlight Line Conditioned Data Stream, LCDS imaging data stream to include a full color standardized approach to specifying colors.

9. The apparatus of claim 7 wherein said modifying of said highlight Line Conditioned Data Stream, LCDS imaging data stream further comprises:

configuring at least one ink value associated with said highlight Line Conditioned Data Stream, LCDS imaging data stream with at least one full color palette.

10. The apparatus of claim 7 wherein said modifying of said highlight Line Conditioned Data Stream, LCDS imaging data stream further comprises:

configuring a convenience specification associated with said highlight Line Conditioned Data Stream, LCDS imaging data stream to include at least one full-color space wherein said convenience specification maps a shorthand inkname associated with a specific color to a particular set of inks to print.

11. The apparatus of claim 7 wherein said modifying of said highlight Line Conditioned Data Stream, LCDS imaging data stream further comprises:

providing a variable color form capability comprising mixed form colors for said highlight Line Conditioned Data Stream, LCDS imaging data stream in place of a palette syntax associated with said highlight Line Conditioned Data Stream, LCDS imaging data stream in order to provide a convenience feature for a user of said Line Conditioned Data Stream, LCDS imaging data stream to define a user selected palette.

12. The apparatus of claim 7 wherein said modifying of said highlight Line Conditioned Data Stream, LCDS imaging data stream comprises:

modifying at least one palette associated with said highlight Line Conditioned Data Stream, LCDS imaging data stream to include a full color standardized approach to specifying colors; said modifying at least one palette comprises:

configuring at least one ink value associated with said highlight Line Conditioned Data Stream, LCDS imaging data stream with at least one full color palette;

configuring a convenience specification associated with said highlight Line Conditioned Data Stream, LCDS imaging data stream to include at least one full-color space; and providing a variable color form capability for said highlight Line Conditioned Data Stream, LCDS imaging data stream in place of a palette syntax associated with said Line Conditioned Data Stream, LCDS imaging data stream in order to provide a convenience feature for a user of said highlight Line Conditioned Data Stream, LCDS imaging data stream.

13. The apparatus of claim 7 further comprising at least one module comprising said processor-readable code.

14. A non-transitory program product residing in a computer, said program product comprising:
 non-transitory instruction media residing in said computer for providing a highlight Line Conditioned Data Stream, LCDS imaging data stream; and
 non-transitory instruction media residing in said computer for modifying said highlight Line Conditioned Data Stream, LCDS imaging data stream utilizing existing constructs of said highlight Line Conditioned Data Stream, LCDS imaging data stream in order to provide extensions to said highlight Line Conditioned Data Stream, LCDS imaging data stream by adding extensions to said highlight Line Conditioned Data Stream, (LCDS imaging data stream) for multiple full-color rendering capabilities without re-writing or converting said highlight Line Conditioned Data Stream, LCDS imaging data stream into another format.

15. The non-transitory program product of claim 14 wherein said non-transitory instruction media residing in said computer for modifying said highlight Line Conditioned Data Stream, LCDS imaging data stream further comprises:
 modifying at least one predefined highlight palette associated with said Line Conditioned Data Stream, LCDS imaging data stream to include a full color standardized approach to specifying colors; said modifying at least one predefined highlight palette comprises:
 configuring at least one ink value associated with said highlight Line Conditioned Data Stream, LCDS imaging data stream with at least one full color palette;
 configuring a convenience specification associated with said highlight Line Conditioned Data Stream, LCDS imaging data stream to include at least one full-color space wherein said convenience specification maps a shorthand inkname associated with a specific color to a particular set of inks to print; and
 providing a variable color form capability comprising mixed form colors for said highlight Line Conditioned Data Stream, LCDS imaging data stream in place of a palette syntax associated with said highlight Line Conditioned Data Stream, LCDS imaging data stream in order to provide a convenience feature for a user of said highlight Line Conditioned Data Stream, LCDS imaging data stream to define a user selected palette.

* * * * *